US012598138B2

(12) United States Patent
Il et al.

(10) Patent No.: US 12,598,138 B2
(45) Date of Patent: Apr. 7, 2026

(54) COMMUNICATION METHOD, COMMUNICATION DEVICE, AND COMMUNICATION SYSTEM

(71) Applicant: Futaba Corporation, Chiba-ken (JP)

(72) Inventors: Yusuke Il, Chiba-Ken (JP); Yusuke Seki, Chiba-Ken (JP); Tomohiro Komiyama, Chiba-Ken (JP); Daichi Sakamoto, Chiba-Ken (JP)

(73) Assignee: Futaba Corporation, Chiba-ken (JP)

( * ) Notice: Subject to any disclaimer, the term of this patent is extended or adjusted under 35 U.S.C. 154(b) by 335 days.

(21) Appl. No.: 18/526,142

(22) Filed: Dec. 1, 2023

(65) Prior Publication Data

US 2024/0205149 A1     Jun. 20, 2024

(30) Foreign Application Priority Data

Dec. 14, 2022     (JP) ................................. 2022-199738

(51) Int. Cl.
*H04L 45/74*          (2022.01)
*H04L 67/12*          (2022.01)
(52) U.S. Cl.
CPC .............. *H04L 45/74* (2013.01); *H04L 67/12* (2013.01)
(58) Field of Classification Search
CPC ......... H04L 45/74; H04L 67/12; H04L 69/06; H04L 1/0007; H04L 67/125
USPC ....................................................... 370/392
See application file for complete search history.

(56) References Cited

U.S. PATENT DOCUMENTS

| | | | |
|---|---|---|---|
| 2015/0023293 A1* | 1/2015 | Erickson ............... H04L 63/061 370/329 |
| 2020/0119975 A1 | 4/2020 | Yoneda et al. | |
| 2020/0120458 A1* | 4/2020 | Aldana ................. H04W 28/22 |
| 2020/0272516 A1 | 8/2020 | Katayama et al. | |

FOREIGN PATENT DOCUMENTS

| | | | | |
|---|---|---|---|---|
| CN | 108469932 A | * | 8/2018 | ........... G06F 3/0486 |
| CN | 110235418 A | | 9/2019 | |
| CN | 111277580 A | | 6/2020 | |
| JP | 2020-141217 A | | 9/2020 | |

OTHER PUBLICATIONS

Korean Office Action cited in corresponding Korean Patent Appln. No. 10-2023-0178459 mailed on Aug. 25, 2025.

* cited by examiner

*Primary Examiner* — Rownak Islam
(74) *Attorney, Agent, or Firm* — BACON&THOMAS,PLLC

(57) ABSTRACT
There is a communication method for a communication device including: a communication control portion configured to perform communication control; a transmission portion configured to transmit a message packet; and a reception portion configured to receive the message packet, the communication method comprising: transmitting a simple message packet in which information of at least part of third information is omitted among first information indicating a type of processing to be executed by a target device identified as a transmission destination device for the message packet, second information for specifying the target device, and the third information indicating details of the processing.

10 Claims, 12 Drawing Sheets

S. COMMUNICATION SYSTEM

2

SERVOMOTOR     SERVOMOTOR    . . .

1               1

S   COMMUNICATION SYSTEM

| | Ar1 | Ar2 | Ar3 | Ar4 | Ar5 | Ar6 |

| HEADER AREA | ID AREA | ADDRESS AREA | DATA LENGTH AREA | DATA AREA | CRC AREA |
|---|---|---|---|---|---|
| 1 Byte | 1 Byte | 1 Byte | 1 Byte | n Byte | 1 Byte |

FIG.5

| | Ar1 | Ar2 | Ar3 | Ar4 | Ar6 |

| HEADER AREA | ID AREA | ADDRESS AREA | DATA LENGTH AREA | CRC AREA |
|---|---|---|---|---|
| 0xF1 | 0x03 | 0x16 | 0x01 | CRC |

FIG.6

| | Ar1 | Ar2 | Ar7 | Ar5 | Ar6 |
|---|---|---|---|---|---|
| | HEADER AREA | ID AREA | FLAG AREA | DATA AREA | CRC AREA |
| | 0x81 | 0x03 | 0x01 | 0x1F | CRC |

FIG.7

| ADDRESS | SIZE | FUNCTION |
|---|---|---|
| ⋮ | ⋮ | ⋮ |
| 0x10 ⸲ 0x13 | 4 Byte | ANGLE DATA |
| 0x14 ⸲ 0x15 | 2 Byte | SPEED DATA |
| 0x16 | 1 Byte | TEMPERATURE DATA |
| 0x17 | 1 Byte | VOLTAGE DATA |
| ⋮ | ⋮ | ⋮ |

FIG.8

| Ar1 | Ar2 | Ar3 | Ar4 | Ar6 |
|-----|-----|-----|-----|-----|
| HEADER AREA | ID AREA | ADDRESS AREA | DATA LENGTH AREA | CRC AREA |
| 0xF1 | 0x03 | 0x10 | 0x07 | CRC |

FIG.9

| ADDRESS | SIZE | FUNCTION | |
|---------|------|----------|--|
| ⋮ | ⋮ | ⋮ | |
| 0xA0 ⌇ 0xA3 | 4 Byte | ANGLE DATA | PA1 |
| 0xA4 | 1 Byte | TEMPERATURE DATA | |
| ⋮ | ⋮ | ⋮ | |
| 0xAF | 1 Byte | DATA LENGTH(0×05) | PA2 |

| Ar1 | Ar2 | Ar6 |
|---|---|---|
| HEADER AREA | ID AREA | CRC AREA |
| 0xF3 | 0x03 | CRC |

| ADDRESS | SIZE | VALUE (EXAMPLE) | FUNCTION | |
|---|---|---|---|---|
| ⋮ | ⋮ | ⋮ | ⋮ | |
| 0xA0 | 1 Byte | 0x10 | ADDRESS OF ANGLE DATA | PA1 |
| 0xA1 | 1 Byte | 0x16 | ADDRESS OF TEMPERATURE DATA | |
| ⋮ | ⋮ | ⋮ | ⋮ | |
| 0xAF | 1 Byte | 0x05 | DATA LENGTH | PA2 |

| | Ar1 | Ar2 | Ar3 | Ar4 | Ar5 | Ar6 |
|---|---|---|---|---|---|---|
| | HEADER AREA | ID AREA | ADDRESS AREA | DATA LENGTH AREA | DATA AREA | CRC AREA |
| | 0xF0 | 0x03 | 0x10 | 0x04 | 0x0018FA2F | CRC |

FIG.13

| ADDRESS | SIZE | VALUE (EXAMPLE) | FUNCTION | |
|---|---|---|---|---|
| : | : | : | : | |
| 0xA0 | 1 Byte | 0x10 | ADDRESS OF ANGLE DATA | PA1 |
| : | : | : | : | |
| 0xAF | 1 Byte | 0x04 | DATA LENGTH | PA2 |

FIG.14

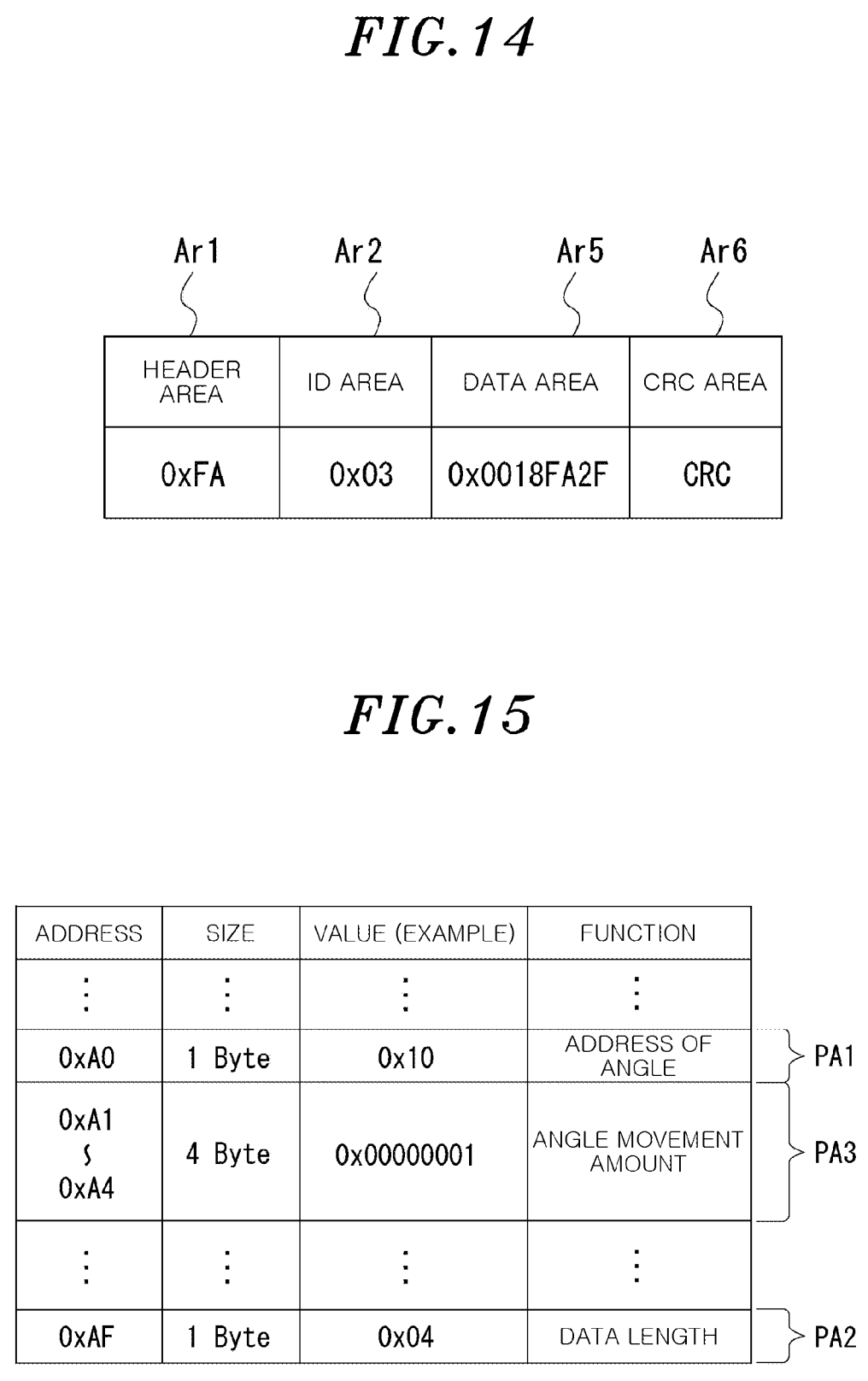

| | Ar1 | Ar2 | Ar5 | Ar6 |
|---|---|---|---|---|
| | HEADER AREA | ID AREA | DATA AREA | CRC AREA |
| | 0xFA | 0x03 | 0x0018FA2F | CRC |

FIG.15

| ADDRESS | SIZE | VALUE (EXAMPLE) | FUNCTION | |
|---|---|---|---|---|
| ⋮ | ⋮ | ⋮ | ⋮ | |
| 0xA0 | 1 Byte | 0x10 | ADDRESS OF ANGLE | PA1 |
| 0xA1 ∫ 0xA4 | 4 Byte | 0x00000001 | ANGLE MOVEMENT AMOUNT | PA3 |
| ⋮ | ⋮ | ⋮ | ⋮ | |
| 0xAF | 1 Byte | 0x04 | DATA LENGTH | PA2 |

FIG.16

| Ar1 | Ar2 | Ar6 |
|---|---|---|
| HEADER AREA | ID AREA | CRC AREA |
| 0xFD | 0x03 | CRC |

COMMUNICATION METHOD, COMMUNICATION DEVICE, AND COMMUNICATION SYSTEM

CROSS-REFERENCE TO RELATED APPLICATIONS

This application claims priority to Japanese Patent Application No. 2022-199738 filed on Dec. 14, 2022, the entire contents of which are incorporated herein by reference.

TECHNICAL FIELD

The present invention relates to a communication method, a communication device, and a communication system when a message packet is transmitted or received between devices.

BACKGROUND

In fields such as FA (Factory Automation) and IA (Industrial Automation), for example, driving of robots or management of operating states is performed by transmission or reception of a message packet between devices.

Transmission or reception of such a message packet may occur at a high frequency.

For example, in two-way control using servomotors, an amount of load in any servomotor is detected and read, and instructions to other servomotors are changed according to a result of the reading. Therefore, transmission and reception of many message packets are performed in a short period of time between devices.

Therefore, it is preferable to perform transmission and reception of a message packet with high efficiency in order to perform control at a high frequency and smoothly.

In Japanese Laid-open Patent Publication No. 2010-049364, a determination is made as to whether detailed information needs to be acquired, and the detailed information is acquired only when it is determined that the detailed information needs to be acquired, thereby acquiring simple information otherwise and achieving high efficiency of data processing.

SUMMARY

However, with the scheme described in Japanese Laid-open Patent Publication No. 2010-049364, it is difficult to achieve efficient data processing in a situation in which a determination is frequently made that detailed information needs to be acquired.

The present invention has been made in consideration of such a problem, and an object of the present invention is to shorten time required for communication.

A communication method according to the present invention is a communication method for a communication device including a communication control portion configured to perform communication control; a transmission portion configured to transmit a message packet; and a reception portion configured to receive the message packet, the communication method including: transmitting a simple message packet in which information of at least part of third information is omitted among first information indicating a type of processing to be executed by a target device identified as a transmission destination device for the message packet, second information for specifying the target device, and the third information indicating details of the processing.

The third information differs depending on a processing type specified by the first information. For example, when the first information is information indicating reading processing, address information of an area in the storage portion which is a reading location, and length information indicating a length of data to be read are included in the third information.

Further, when the first information is information indicating write processing, address information of an area in the storage portion serving as a writing location, and length information indicating a length of writing data are included in the third information.

In the simple message packet, for example, the address information and the length information are omitted.

A communication system according to the present invention is a communication system including a plurality of communication devices, each communication device including: a communication control portion configured to perform communication control; a transmission portion configured to transmit a message packet; and a reception portion configured to receive the message packet, wherein the communication control portion transmits a simple message packet in which information of at least part of third information is omitted among first information indicating a type of processing to be executed by a target device identified as a transmission destination device for the message packet, second information for specifying the target device, and the third information indicating details of the processing.

According to the present invention, it is possible to shorten time required for communication.

BRIEF DESCRIPTION OF THE DRAWINGS

FIG. 3 is a block diagram illustrating a configuration example of a control device.

FIG. 4 is a diagram illustrating an example of a configuration of a normal message packet.

FIG. 5 is a diagram illustrating a specific example of the normal message packet.

FIG. 6 is a diagram illustrating a structure example and specific example of a return packet.

FIG. 7 is a diagram illustrating an example of a location of a memory map of a storage portion of the servomotor.

FIG. 8 is a diagram illustrating a specific example of a normal message packet for a reading command.

FIG. 9 is a diagram of a preset area of the storage portion of the servomotor.

FIG. 12 is a diagram illustrating a specific example of a normal message packet for a writing command.

FIG. 13 is a diagram illustrating an example of a preset area for a second example of the simple message packet.

FIG. 14 is a diagram illustrating a specific example of the second example of the simple message packet.

FIG. 15 is a diagram illustrating an example of a preset area for a third example of the simple message packet.

FIG. 16 is a diagram illustrating a specific example of the third example of the simple message packet.

DETAILED DESCRIPTION

Hereinafter, embodiments will be described in the following order.

<1. System Configuration>
<2. Structure of Message Packet>
<2-1. Normal Message Packet>
<2-2. Return Packet>
<2-3. Simple Message Packet 1>
<2-4. Simple Message Packet 2>
<2-5. Simple Message Packet 3>
<3. Flowchart>
<3-1. Processing of Control Device>
<3-2. Servomotor processing>
<4. Modification Example>
<5. Conclusion>

1. System Configuration

A configuration of a communication system S including a servomotor 1 as a first communication device and a control device 2 as a second communication device will be described with reference to FIG. 1.

The communication system S includes a plurality of servomotors 1 and one control device 2. Further, the communication system S may include one servomotor 1 and one control device 2, or may include a plurality of servomotors 1 and a plurality of control devices 2.

The servomotor 1 is a control target device. Further, the control device 2 is a device that controls the control target device.

The servomotor 1 is capable of transmitting or receiving information to or from the control device 2, for example, through a wired connection.

Further, for example, a control target device such as a robot may include one wireless communication portion, and the control device 2 may perform wireless communication only with the wireless communication portion of the robot. In this case, the wireless communication portion included in the robot may control each portion of the robot/servomotor by outputting a control instruction or the like to the servomotor 1 installed in each portion of the robot by wire or the like, on the basis of the content of the message packet received from the control device 2. That is, the servomotor 1 may be unable to communicate directly with the control device 2.

Further, in this case, the wireless communication portion included in the robot may be identified as the control device 2. That is, the control device 2 receives various types of information from other information processing devices and outputs a control instruction or the like to each servomotor 1 connected to the control device 2 by wire.

Further, the servomotor 1 and the control device 2 may perform wireless communication. In the wireless communication in this case, for example, the vicinity of each frequency band such as 429 MHz (megahertz), 920 MHz, 1.2 GHz (gigahertz), 2.4 GHz, 5 GHz, and 6 GHz is used.

Figure 2:
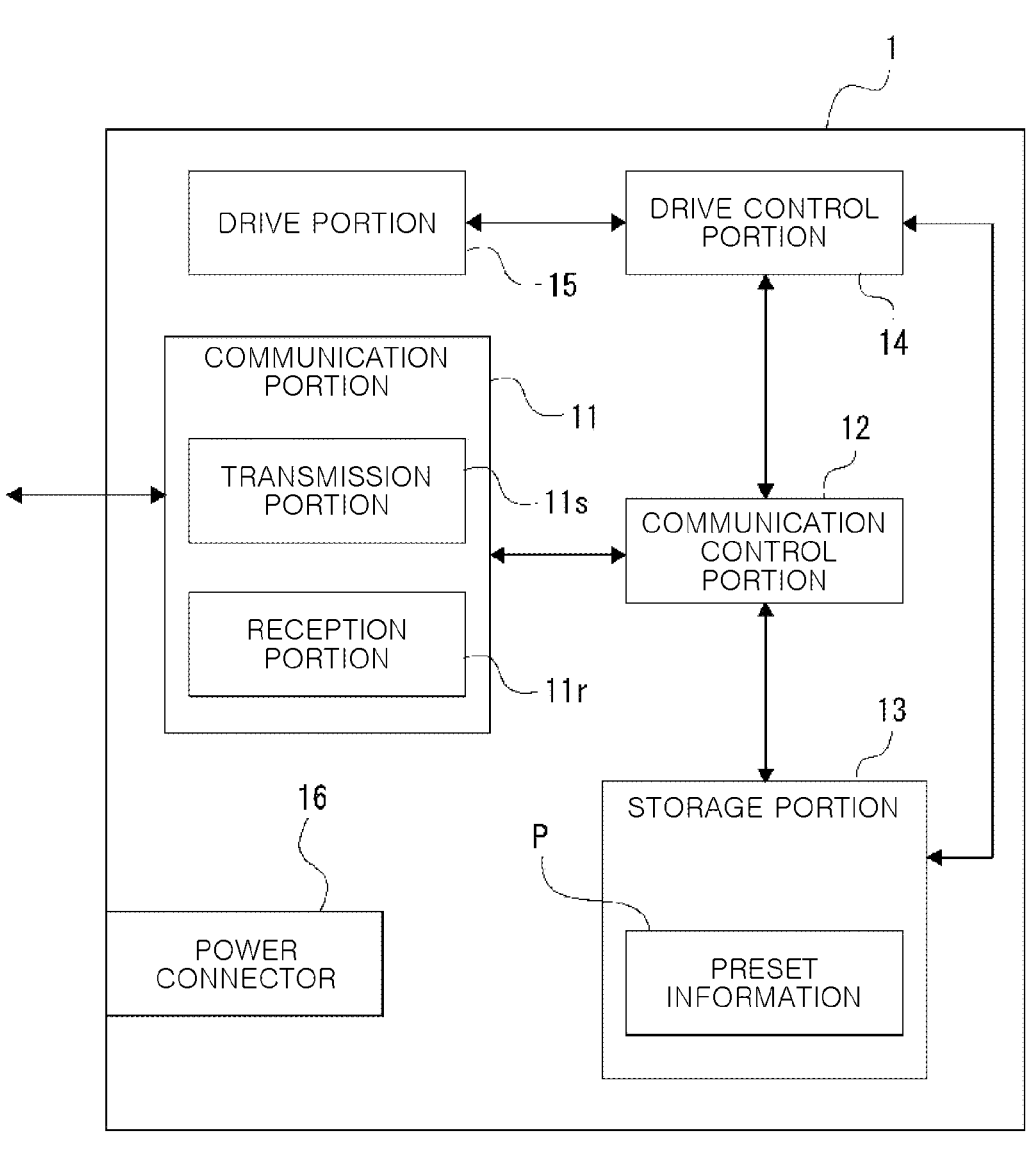
FIG. 2 is a block diagram illustrating a configuration example of a servomotor.

An example of a configuration of the servomotor 1 is illustrated in FIG. 2.

The servomotor 1 includes a communication portion 11 that performs wired communication with other devices via a connector, or the like, a communication control portion 12 that controls the communication portion 11, a storage portion 13, a drive control portion 14, a drive portion 15, and a power connector 16.

The communication portion 11 includes a transmission portion 11s and a reception portion 11r. The transmission portion 11s and the reception portion 11r are configured as, for example, an IC (Integrated Circuit). The transmission portion 11s and the reception portion 11r may be configured as one IC in which a modulation portion, a power amplification portion, a high-frequency amplification portion, and a demodulation portion are formed integrally. Further, the transmission portion 11s and the reception portion 11r may be configured as different ICs.

The transmission portion 11s executes processing for transmitting the packet delivered from the communication control portion 12, to the control device 2 as a return packet. The reception portion 11r receives the message packet transmitted from the control device 2 and performs processing for delivering the message packet to the communication control portion 12. Further, the reception portion 11r can receive a simple message packet in which some information has been omitted, in addition to a normal message packet.

The communication control portion 12 is configured of, for example, a central processing unit (CPU), and performs processing for creating a return packet, or reads a header area of a received message packet and performs processing according to content (command) thereof.

The storage portion 13 is configured of a read only memory (ROM), a random access memory (RAM), or the like, and stores various programs executed by the communication control portion 12 or the drive control portion 14, setting data, a device ID (Identification) for uniquely specifying the servomotor 1, and the like.

Further, supplement information for executing appropriate processing on the basis of the simple message packet is stored in the storage portion 13. This supplement information is information stored in advance before reception of the simple message packet, and is described as "preset information P." Further, an area in the storage portion 13 in which the preset information P is stored is described as a preset area PA.

The preset information P and the preset area PA will be described again below.

Further, the storage portion 13 also functions as a work area when the communication control portion 12 or the drive control portion 14 executes various processing.

The drive control portion 14 drives the drive portion 15 of the servomotor 1 on the basis of an instruction from the communication control portion 12 or on the basis of setting information stored in the storage portion 13. As the drive portion 15 is driven by the drive control portion 14, a posture of, for example, a control target robot to which the servomotor 1 has been attached changes.

Further, the drive control portion 14 can detect a drive state of the drive portion 15, or the like. Specifically, the drive control portion 14 can detect a temperature, angle, voltage, speed, or the like. This detection information is stored in a predetermined area of the storage portion 13.

Figure 1:
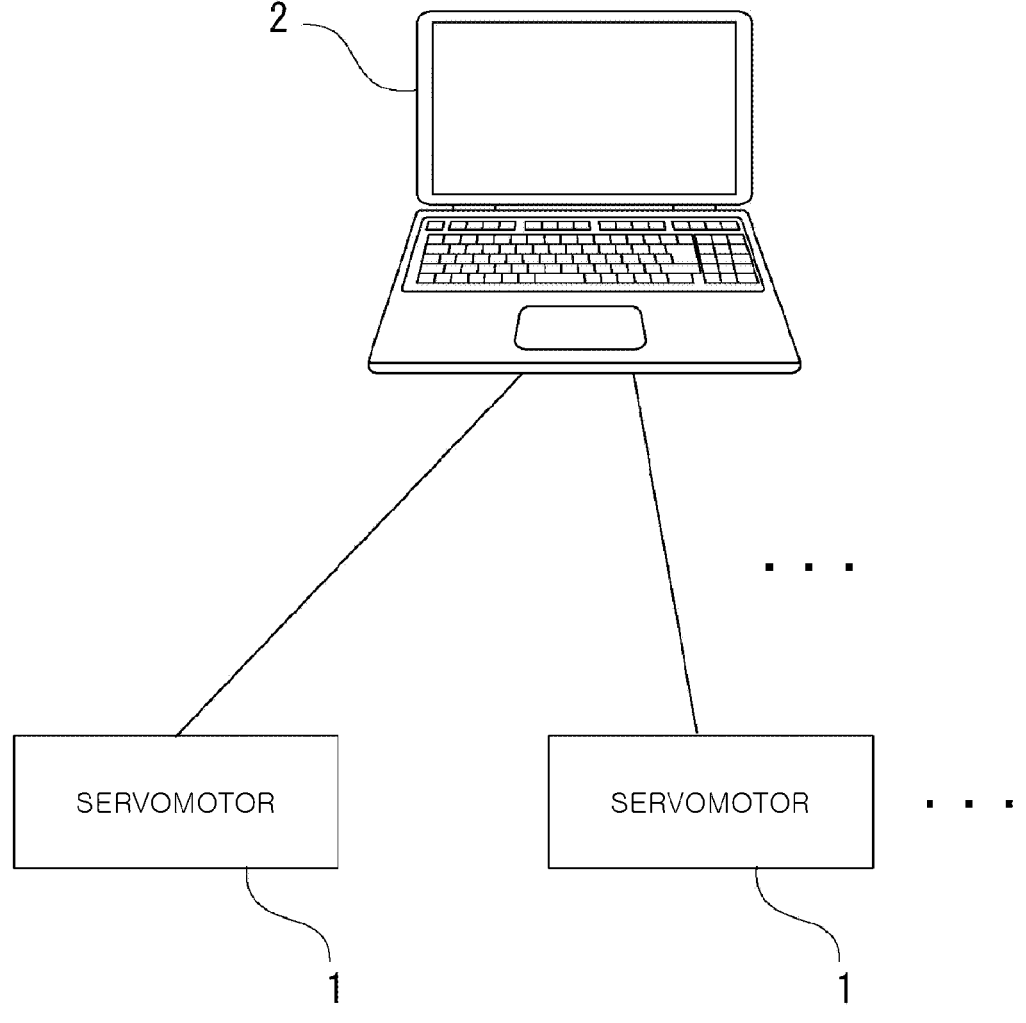
FIG. 1 is a diagram illustrating a configuration example of a communication system.

Further, although FIG. 1 illustrates an example in which the servomotor 1 has a communication function, the servomotor 1 and a portion with the communication function may be configured as other devices. In that case, the servomotor 1 and the portion with the communication function are connected by, for example, start-stop synchronous serial communication (RS232C) or short-distance wireless communication.

The power connector 16 applies an operating supply voltage input from the outside to the respective portions (for example, the communication control portion 12, the transmission portion 11*s*, the reception portion 11*r*, and the storage portion 13) of the servomotor 1. The power connector 16 may be installed integrally with a connector for wired communication, for example. That is, the servomotor 1 and the control device 2 may be connected by one cable including a power supply line and a communication line.

Further, a power supply portion that generates a supply voltage may be installed instead of the power connector 16. The power supply portion in this case is, for example, a lithium ion battery or dry cell. Further, a supply voltage line to each portion is omitted in order to avoid complexity.

Figure 3:
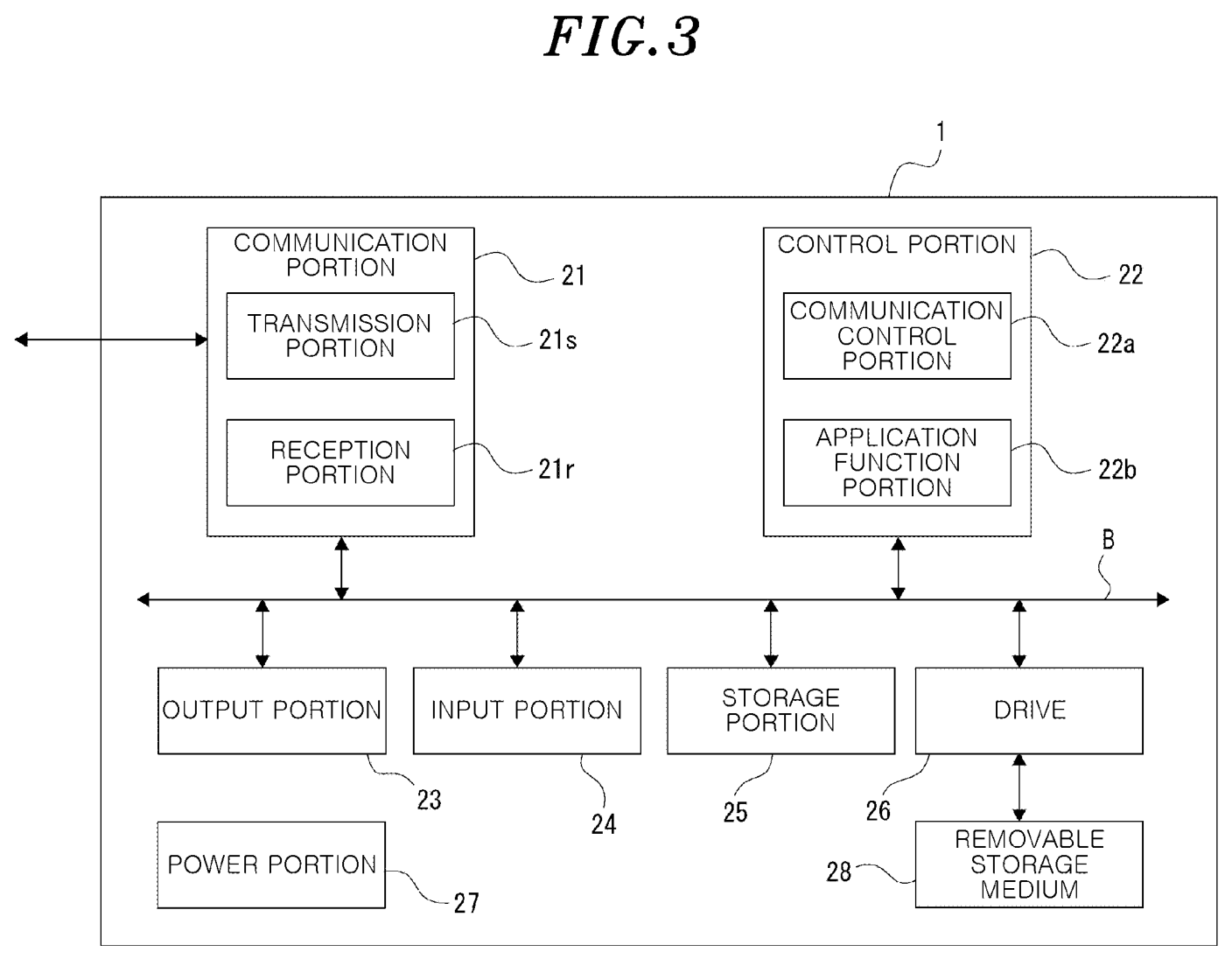

Next, an example of a configuration of the control device 2 is illustrated in FIG. 3.

The control device 2 includes a communication portion 21 that performs wired communication with other devices via a connector, a control portion 22, an output portion 23, an input portion 24, a storage portion 25, a drive 26, and a power supply portion 27, and the respective portions are communicatively connected to each other via bus B.

The communication portion 21 includes a transmission portion 21*s* and a reception portion 21*r*. The transmission portion 21*s* and the reception portion 21*r* may be configured as the same IC or may be configured as different ICs.

The communication portion 21 transmits the message packet and receives the return packet on the basis of an instruction from the communication control portion 22*a* of the control portion 22.

Specifically, the transmission portion 21*s* executes processing for transmitting, to the servomotor 1, the message packet delivered from the communication control portion 22*a*.

The reception portion 21*r* receives the return packet transmitted from the servomotor 1 and performs processing for delivering the return packet to the communication control portion 22*a*. Further, the transmission portion 21*s* can transmit the simple message packet, in addition to the normal message packet.

The control portion 22 includes a CPU, ROM, RAM, or the like, and realizes various functions by executing programs.

Specifically, the control portion 22 functions as the communication control portion 22*a* or an application function portion 22*b*.

As described above, the communication control portion 22*a* causes the communication portion 21 to generate or transmit and receive message packets.

The application function portion 22*b* performs various processing for operating an application for controlling or managing the plurality of servomotors 1. For example, the communication control portion 22*a* is caused to execute generation and transmission of the message packet in order to change a posture of the robot to which the servomotor 1 has been attached, according to an operation input by the user through the application.

The application function portion 22*b* executes display processing for display an interface for accepting user operations on the output portion 23, such as a monitor.

Further, the application function portion 22*b* may perform display processing for presenting, for example, an operating status of each servomotor 1 to the user.

The output portion 23 is identified as a display portion such as a liquid crystal display (LCD) or an organic electroluminescence (EL) panel, an audio output portion such as a speaker, or the like. The output portion 23 is installed integrally with or separately from the control device 2.

In a display portion as the output portion 23, various types of information, menus, or the like is displayed through the display processing in the application function portion 22*b*.

The input portion 24 is identified as, for example, various operators or operating devices such as a keyboard, mouse, keys, dial, touch panel, touch pad, and remote controller. This input portion 24 detects an operation by the user and outputs a detection signal to the control portion 22.

The storage portion 25 is configured as a hard disk, a solid-state memory, or the like, and stores programs executed by the control portion 22, data used for processing, and the like.

A removable storage medium 28 such as a magnetic disk, optical disc, magneto-optical disc, or semiconductor memory can be mounted on the drive 26. Information read from the removable storage medium 28 is stored in the storage portion 25, for example.

The power supply portion 27 generates a supply voltage required for each portion and supplies the operating supply voltage to each portion of the control device 2. The power supply portion 27, for example, converts an input commercial alternating voltage into direct current voltage and supplies the direct current voltage to each portion. Further, a supply voltage line to each portion is omitted in order to avoid complexity.

2. Structure of Message Packet

In the present embodiment, the normal message packet and the simple message packet are transmitted and received. Each will be described with reference to the accompanying drawings.

<2-1. Normal Message Packet>

An example of the normal message packet is illustrated in FIG. 4.

The normal message packet includes a header area Ar1, an ID area Ar2, an address area Ar3, a data length area Ar4, a data area Ar5, and a CRC (Cyclic Redundancy Check) area Ar6.

The header area Ar1 is an area in which a 1-byte command is stored. Examples of the command include a reading command, a writing command, a preset reading command, and a preset writing command. Further, other examples of the command include various commands such as a command for confirming whether or not the servomotor 1 is operating normally.

The ID area Ar2 is an area in which 1-byte information indicating a device ID for specifying a transmission target device is stored. For example, in the reading command or the writing command, a device ID of the servomotor 1 that is a reading target or the servomotor 1 that is a writing target is stored in the ID area Ar2.

The address area Ar3 is an area in which 1-byte information indicating the address in the storage portion 13 of the servomotor 1 is stored. In the case of the reading command, a start address of a reading target area is stored in the address area Ar3. Further, in the case of the writing command, a start address of a writing target area is stored in the address area Ar3.

The data length area Ar4 is an area in which 1-byte information indicating the data length is stored. The reading target area or the writing target area can be specified by the start address stored in the address area Ar3 and the data length stored in the data length area Ar4.

The data area Ar5 is an area in which n-Byte (n is a positive integer) information written by a writing command is stored. The number of bytes of information stored in the data area Ar5 varies depending on a size of the writing target area.

A 1-byte redundant code for detecting an error in data other than the CRC area is stored in the CRC area Ar6. Further, a redundant code for detecting only an error in the data area Ar5 may be stored in the CRC area Ar6.

Further, for example, a code using a BCC (Block Check Character) may be stored in the CRC area Ar6 as an error check code other than the CRC. That is, an error check (error correction) scheme does not matter.

Further, FIG. 4 is an excerpt of only a main part of a structure of the message packet, and an actual message packet may include a preamble area, a synchronization code area, a control data area, or the like, in addition to each area illustrated in FIG. 4.

An example of the normal message packet transmitted from the control device 2 to the servomotor 1 to read a status of the servomotor 1 is illustrated in FIG. 5. Further, for a numerical value in hexadecimal notation, "0x" is added at the beginning. That is, when "10" in decimal is expressed as a 1-byte hexadecimal number, 10 is written as "0x0A".

0xF1 is stored in the header area Ar1. 0xF1 represents a reading command targeted at one servomotor 1.

0x03 is stored in the ID area Ar2. This information is information indicating that it is the normal message packet transmitted to the servomotor 1 of which the device ID is identified as "3". That is, the example illustrated in FIG. 5 shows a message packet for reading information from the storage portion 13 of the servomotor 1 of which the device ID is identified as "3".

0x16 is stored in the address area Ar3. This information is an address of an area in the storage portion 13 of the servomotor 1 in which sensing data for temperature is stored.

0x01 is stored in the data length area Ar4. This information indicates that the data to be read consists of 1 byte.

In the CRC area Ar6, a specific numerical value is omitted.

That is, an example of the normal message packet illustrated in FIG. 5 is a packet for reading temperature data sensed in one servomotor 1 to which "3" is assigned as the device ID.

<2-2. Return Packet>

Next, an example of the return packet returned from the servomotor 1 is illustrated in FIG. 6. The return packet illustrated in FIG. 6 is a return packet returned from the servomotor 1 when the normal message packet illustrated in FIG. 5 is transmitted to the servomotor 1 of which the device ID is identified as "3."

The return packet returned from the servomotor 1 includes, for example, a header area Ar1, an ID area Ar2, a flag area Ar7, a data area Ar5, and a CRC area Ar6.

"0x81" is stored as information indicating a return for a reading command in the header area Ar1.

A device ID for the servomotor 1 that is a transmission source for the return packet is stored in the ID area Ar2.

The flag area Ar7 stores 1-byte information in which various flag pieces of information are integrated. That is, since the flag area Ar7 includes 8 bits, the flag area Ar7 can include eight flag pieces of information. As the flag information, for example, various error flags for presence or absence of a communication error, hardware error, or the like, a flag indicating, for example, whether the drive portion 15 of the servomotor 1 has reached a target location, or the like are considered.

Temperature information that is a sensing result is stored in the data area Ar5.

In the CRC area Ar6, a 1-byte redundant code for detecting an error is stored, although a specific numeric value is omitted.

<2-3. Simple Message Packet 1>

Next, a first structure example of the simple message packet will be described.

First, an example of a memory map of the storage portion 13 of the servomotor 1 is illustrated in FIG. 7 before a structure example of the simple message packet is described.

Angle data is stored in a 4-byte area from addresses 0x10 to 0x13 in the storage portion 13. The angle data is identified as, for example, control data from the control device 2.

Speed data is stored in a 2-byte area from addresses 0x14 to 0x15 in the storage portion 13. The speed data is identified as, for example, sensing data detected by the servomotor 1.

The temperature data is stored in a 1-byte area with an address 0x16 in the storage portion 13. The temperature data is identified as, for example, sensing data detected in the servomotor 1.

Voltage data is stored in a 1-byte area with an address 0x17 in the storage portion 13. The voltage data is identified as, for example, sensing data detected in the servomotor 1.

Here, a case in which the angle data and the temperature data are read from the storage portion 13 of the servomotor 1 will be considered. The control device 2 transmits, for example, a normal message packet illustrated in FIG. 8 to the servomotor 1.

This normal message packet is a command for reading 7 bytes of data from a start address 0x10 in the storage portion 13.

When this message packet is transmitted, 7-byte data from the addresses 0x10 to 0x16 is returned as the return packet from the servomotor 1 to the control device 2.

This makes it possible to read the angle data and the temperature data from the storage portion 13 of the servomotor 1.

However, not only the angle data and the temperature data but also the speed data is included in the data area Ar5 of the return packet returned from the servomotor 1. Accordingly, since extra information other than information desired to be acquired is included in the packet, communication efficiency is poor.

Therefore, the preset area PA is provided in another area of the storage portion 13 of the servomotor 1, and desired data is separately and continuously stored there. An example thereof is illustrated in FIG. 9.

As shown, 4-byte angle data is separately stored in an area from addresses 0xA0 to 0xA3 in the preset area PA of the storage portion 13. Further, 1-byte temperature data is separately stored in an area with an address 0xA4 in the preset area PA.

In the preset area PA, an area for storing acquisition target data is referred to as a "first preset area PA1". That is, the first preset area PA1 in FIG. 9 is identified as an area from the addresses 0xA0 to 0xA4. The preset information P stored in the first preset area PA1 is identified as the angle data and the temperature data.

In this state, the control device 2 can acquire desired data without reading unnecessary data, by transmitting the message packet so that the first preset area PA1 in the storage portion 13 of the servomotor 1 is read. Specifically, the control device 2 can read only the angle data and the temperature data by storing 0xA0 in the address area Ar3 and 0x05 in the data length area Ar4 in FIG. 8.

In the present embodiment, research has been being conducted to further reduce an amount of data.

Specifically, in the preset area PA, a second preset area PA2 in which the data length of the data to be read is stored in advance is prepared in addition to the first preset area PA1.

The second preset area PA2 illustrated in FIG. 9 is identified as a 1-byte area with address 0xAF. The 1-byte preset information P stored in the second preset area PA2 is identified as data length information, and in this example, 0x05 is stored.

The control device 2 transmits the simple message packet when reading the angle data and the temperature data from the servomotor 1. An example of the simple message packet is illustrated in FIG. 10.

The simple message packet is a packet in which the information stored in the first preset area PA1 and the second preset area PA2 among the respective data areas constituting the normal message packet is omitted.

Figures 10, 11:
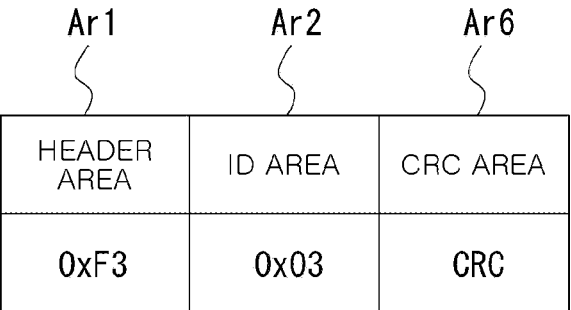
FIG. 10 is a diagram illustrating a specific example of a simple message packet for a reading command.
FIG. 11 is a diagram of a modification example of the preset area.

That is, as illustrated in FIG. 10, the simple message packet includes a header area Ar1, an ID area Ar2, and a CRC area Ar6, and an address area Ar3 and a data length area Ar4 are omitted.

Further, 0xF3 indicating a preset reading command is stored in the header area Ar1. That is, the simple message packet illustrated in FIG. 10 is identified as a simple message packet for a reading command.

The servomotor 1 which has received the simple message packet in which 0xF3 is stored in the header area Ar1 confirms that the data length of the data to be read is 5 Bytes on the basis of the information stored in the second preset area PA2. The servomotor 1 reads 5 bytes of the information stored in the first preset area PA1, stores the information in the data area Ar5 of the return packet, and transmits the information to the control device 2.

This makes it possible to acquire desired data while reducing an amount of data of the packet to be transmitted from the control device 2 to the servomotor 1.

Further, it becomes possible to efficiently read several pieces of data by preparing a plurality of commands for a simple message packet and constructing each command to read a different area in the preset area PA of the storage portion 13 of the servomotor 1.

Here, a modification example of the preset area PA will be described.

In the example illustrated in FIG. 9, an example in which the sensing data or setting data itself is stored in the first preset area PA1 has been described.

In the present modification example, as illustrated in FIG. 11, address information is stored in the first preset area PA1.

Specifically, 0x10 which is a start address of an area in which the angle data is stored is stored in an area identified as the address 0xA0 in the first preset area PA1 of the storage portion 13 of the servomotor 1. Further, 0x16 which is a start address of the area in which the temperature data is stored is stored in the area identified as an address 0xA1.

0x05 which is data length information, is stored as the preset information P in the second preset area PA2.

The servomotor 1 which has received a simple message packet (see FIG. 10) in which 0xF3 is stored in the header area Ar1 conforms that the data length of the data to be read is 5 Bytes on the basis of the information stored in the second preset area PA2. The servomotor 1 reads the angle data stored in the addresses 0x10 to 0x13 and the temperature data stored in the address 0x16 by referring to the address stored in the first preset area PA1, stores the angle data and the temperature data in the data area Ar5 of the return packet, and transmits the angle data and the temperature data to the control device (2).

In this aspect, it is also possible to acquire desired data while reducing an amount of data of the packet to be transmitted from the control device 2 to the servomotor 1.

Further, in this example 0x05 identified as data length information is stored in the second preset area PA2 identified as the 1-byte area with address 0xAF, as illustrated in FIG. 9.

5-byte information thereof are 5 bytes of the information stored in the first preset area PA1, and details thereof includes 4-byte angle data and 1-byte temperature data.

Here, a configuration for additionally reducing the amount of data when it is sufficient to obtain 1-byte data as the angle data will be described.

In a case in which only 1-byte angle data and 1-byte temperature data need to be acquired, 0x02 is stored as data length information in the second preset area PA2.

The control device 2 transmits the message packet illustrated in FIG. 10 as a simple message packet for reading the angle data and the temperature data in the servomotor 1.

The servomotor 1 which has received the simple message packet in which 0xF3 is stored in the header area Ar1 confirms that the data length of the data to be read is 2 Bytes on the basis of the information stored in the second preset area PA2. The servomotor 1 reads 2-byte data as the information stored in the first preset area PA1.

The data read in this case is 1-byte data as the angle data and 1-byte data as the temperature data. That is, on the basis of the two address pieces of information stored in the first preset area PA1 illustrated in FIG. 11, the 1-byte angle data stored at the address 0x10 and the 1-byte temperature data stored at the address 0x16 are read, stored in the return packet data area Ar5, and transmitted to the control device 2.

This makes it possible to further reduce an amount of data of the return packet.

<2-4. Simple Message Packet 2>

A second example of the simple message packet will be described. This example is an example of the simple message packet that is transmitted in order to write data.

First, an example of a normal message packet transmitted from the control device 2 to the servomotor 1 when data is written to a predetermined area of the storage portion 13 of the servomotor 1 is illustrated in FIG. 12.

This normal message packet includes a header area Ar1, an ID area Ar2, an address area Ar3, a data length area Ar4, a data area Ar5, and a CRC area Ar6.

0xF0 indicating a normal message packet for a writing command is stored in the header area Ar1.

A device ID (0x03 in FIG. 12) for the servomotor 1 which is a transmission destination of the normal message packet is stored in the ID area Ar2.

0x10 which is a start address of the area in which the angle data is stored in the storage portion 13 of the servomotor 1 is stored in the address area Ar3.

0x04 which is the data length of the angle data is stored in the data length area Ar4.

4-byte angle data is stored in the data area Ar5.

Detailed description of the CRC area Ar6 is omitted.

The control device 2 can control an angle of the drive portion 15 of the servomotor 1 by transmitting the normal message packet as illustrated in FIG. 12 to the servomotor 1.

Here, an example of the information stored in the first preset area PA1 and the second preset area PA2 of the storage portion 13 of the servomotor 1 in order to enable transmission of a simple message packet for a preset writing command is illustrated in FIG. 13.

In the example illustrated in FIG. 13, 0x10 which is the start address of the area in which the angle data is stored is stored in the first preset area PA1 (the address 0xA0).

Further, the data length (4 bytes) of the angle data is stored in the second preset area PA2 (address 0xAF).

An example of a simple message packet for a preset writing command transmitted from the control device 2 to the servomotor 1 in a state in which an address of the angle data is stored in the first preset area PA1 and the data length is stored in the second preset area PA2 is illustrated in FIG. 14.

As shown, in the simple message packet, the address area Ar3 and the data length area Ar4 are omitted.

Further, 0xFA indicating the simple message packet for a writing command is stored in the header area Ar1.

Further, FIGS. 13 and 14 illustrate a structure for transmitting a simple message packet for writing one piece of data (the angle data in this example), but it is also possible to transmit a simple message packet for writing a plurality of pieces of data.

For example, a start address of the angle data is stored in the address 0xA0 in the first preset area PA1, and a start address of the speed data is stored in the address 0xA1. 0x06 which is a sum of the data length of the angle data and the data length of the speed data is stored in the second preset area PA2.

6-byte data in which the angle data and the speed data are made continuous is stored in the data area Ar5 of the simple message packet.

This makes it possible for the servomotor 1 to perform control based on the angle data and the speed data stored in the simple message packet.

Further, in FIG. 7, the areas in which the angle data and the speed data are continuous areas, but even when the areas in which the angle data and the speed data are stored are separated, two pieces of data can be rewritten with one simple message packet.

<2-5. Simple Message Packet 3>

A third example of the simple message packet will be described. This example is an example of the simple message packet that is transmitted in order to write data, like the second example. Further, this is an example of the simple message packet in which the angle data to be written is also omitted, unlike the second example.

First, an example of information stored in the first preset area PA1, the second preset area PA2, and the third preset area PA3 of the storage portion 13 of the servomotor 1 in order to enable transmission of the simple message packet of this example for writing is illustrated in FIG. 15.

As shown, 0x10 which is the start address of the area in which the angle data is stored is stored in the address 0xA0 in the first preset area PA1.

Further, the data length (4 bytes) of the angle data is stored in the second preset area PA2.

Further, angle movement amount data (0x00000001) is stored in the third preset area PA3.

The angle movement amount data stored in the third preset area PA3 is data added to the current angle data. In the example illustrated in FIG. 15, "1" which is a minimum control portion is stored as angle movement data.

That is, when the servomotor 1 receives the simple message packet in this example, the servomotor 1 performs processing for updating the current angle data by adding (or subtracting) "1" to (or from) the current angle data.

Further, it is preferable for the angle movement amount data stored in the third preset area PA3 to be data that is frequently used. This makes it possible to increase an opportunity to transmit the simple message packet instead of the normal message packet, and to increase effects of reduction in the amount of data.

Further, when processing for setting the angle data as an initial value occurs frequently, the angle data itself may be stored in the third preset area PA3 instead of the angle movement amount data.

An example of the simple message packet in this example is illustrated in FIG. 16.

As shown, although the simple message packet of this example is intended to write the angle data, the address area Ar3, the data length area Ar4, and the data area Ar5 are omitted.

Further, 0xFD indicating a simple message packet for a preset writing command in which the address area Ar3, the data length area Ar4, and the data area Ar5 have been omitted is stored in the header area Ar1.

Accordingly, the amount of data of the packet to be transmitted is greatly reduced.

Further, in FIG. 15, the third preset area PA3 is a 4-byte area. However, since the angle movement amount data is a data amount of 1 byte, "0x01" may be stored in the address 0xA1.

In this aspect, angle data can also be updated appropriately.

Further, it is possible to reduce the third preset area PA3.

3. Flowchart

<3-1. Processing of Control Device>

Figure 17:
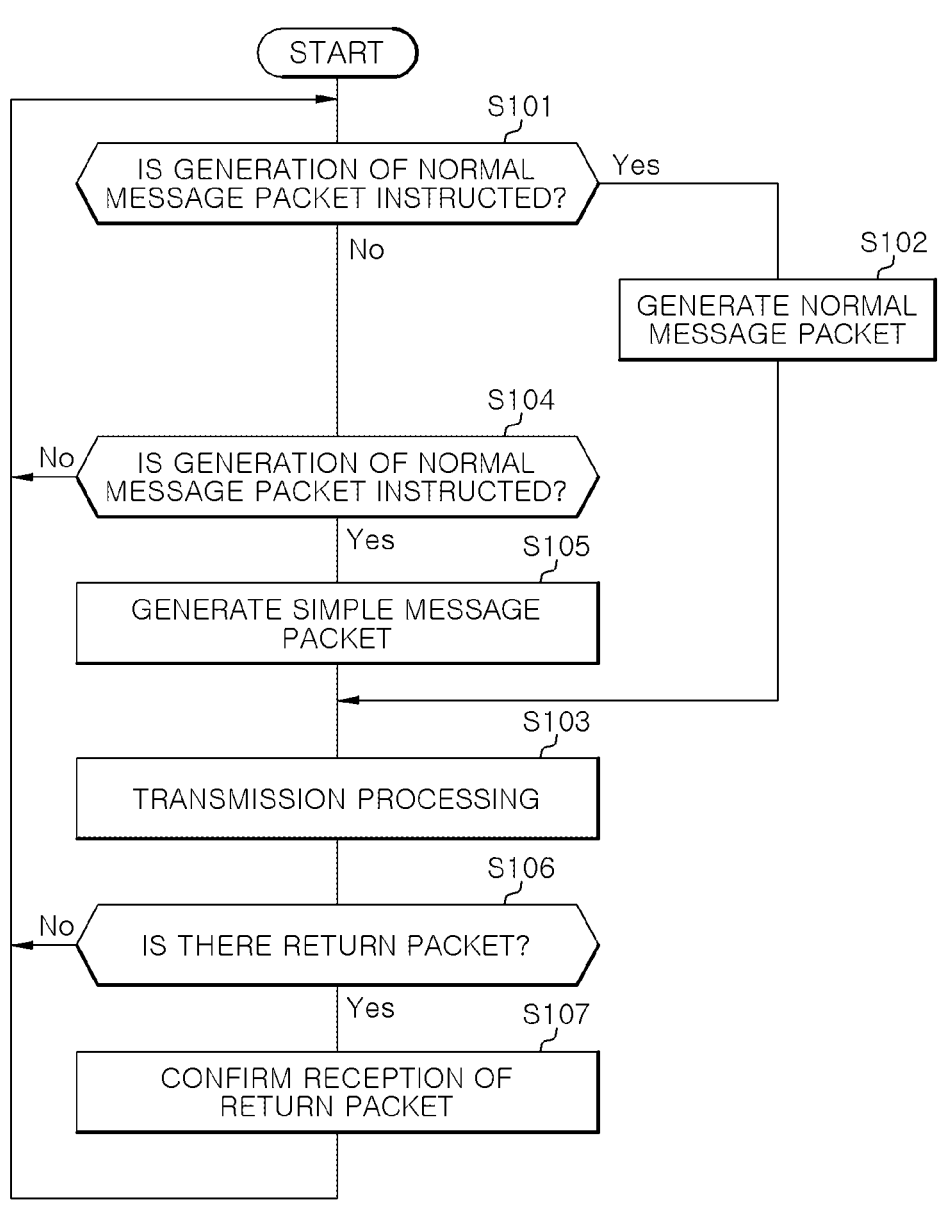
FIG. 17 is a flowchart illustrating an example of processing that is executed in the control device.

An example of processing executed by the control portion 22 of the control device 2 is illustrated in FIG. 17.

The control portion 22 first determines whether an instruction to generate the normal message packet has been issued in step S101.

When the control portion 22 determines that a normal message packet generation instruction has been issued, for example, when the normal message packet is selected through an operation by the user, the control portion 22 generates the normal message packet according to the instruction in step S102 and transmits the normal message packet to the servomotor 1 that is a transmission target in step S103.

On the other hand, when the control portion 22 determines in step S101 that the normal message packet generation instruction has not been issued, the control portion 22 determines whether a simple message packet generation instruction has been issued, in step S104.

When the control portion 22 determines that the simple message packet generation instruction has been issued, the control portion 22 generates the simple message packet in step S105 and transmits the simple message packet to the servomotor 1 that is the transmission target in step S103.

When the control portion 22 transmits the normal message packet or the simple message packet in step S103, the control portion 22 determines the presence or absence of a return packet in step S106. The presence or absence of the return packet varies depending on a type of the message packet transmitted in step S103.

For example, when a message packet requiring no return packet is transmitted in the previous step S103, the control portion 22 determines in step S106 that there is no return packet.

On the other hand, when a message packet requiring a return packet is transmitted in the previous step S103, the control portion 22 determines in step S106 that there is the return packet.

When the control portion 22 determines that there is no returned packet, the control portion 22 returns to the processing of step S101.

On the other hand, when the control portion 22 determines that there is the returned packet, the control portion 22 confirms reception of the return packet in step S107 and returns to the processing of step S101.

Further, although the illustration in FIG. 17 is omitted, when an error code or the like is included in the received return packet, the control portion 22 may perform message packet retransmission processing, restart processing of the servomotor 1, or the like.

Further, when the control portion 22 determines that the generation instruction has not been issued for both the normal message packet and the simple message packet (NO determination in both steps S101 and S104), the control portion 22 returns to the processing of step S101 again.

<3-2. Processing of Servo Motor>

Figure 18:
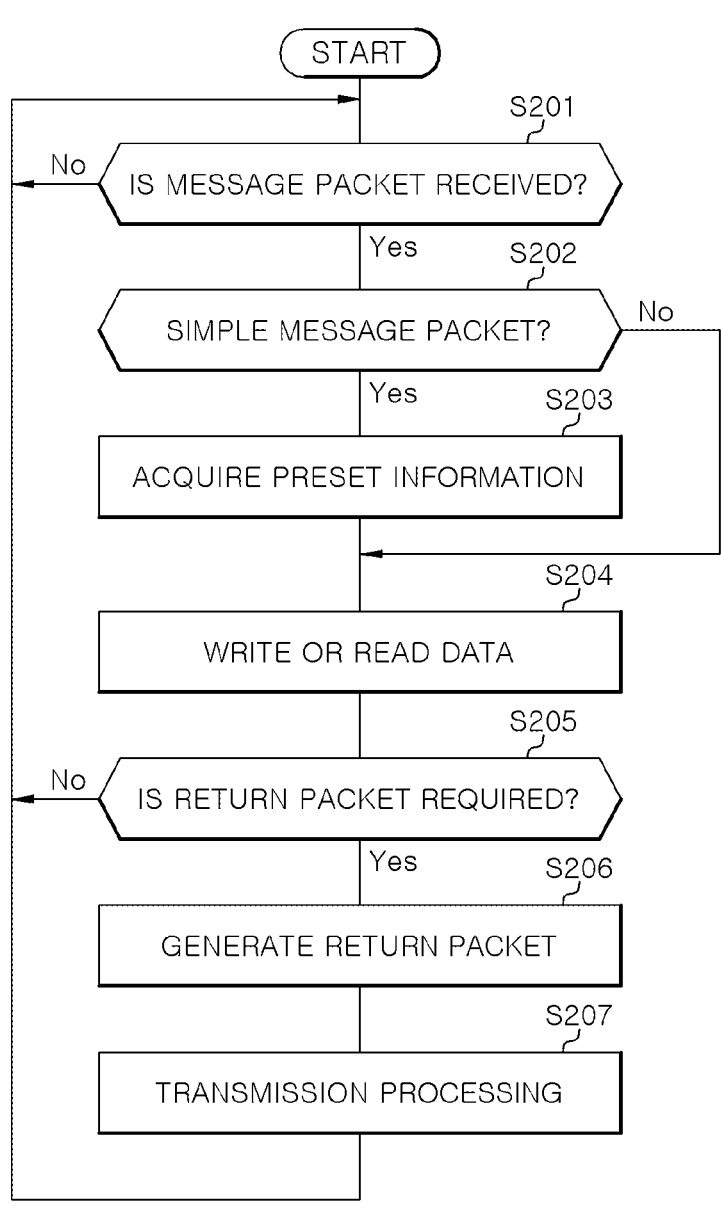
FIG. 18 is a flowchart illustrating an example of processing that is executed in the servomotor.

An example of processing executed by the communication control portion 12 of the servomotor 1 is illustrated in FIG. 18.

The communication control portion 12 determines whether the message packet has been received from the control device 2 in step S201.

When the communication control portion 12 determines that the message packet has not been received, the communication control portion 12 repeats the processing of step S201 again.

On the other hand, the communication control portion 12 determines that the message packet has been received, the communication control portion 12 determines whether the received message packet is the simple message packet in step S202.

When the communication control portion 12 determines that the simple message packet has been received, the communication control portion 12 acquires the preset information P in step S203, to ascertain content of the instruction from the control device 2 and specify processing to be executed performed.

On the other hand, when the communication control portion 12 determines that the normal message packet has been received (step S202: NO determination), the communication control portion 12 avoids the processing of step S203.

Subsequently, the communication control portion 12 writes or reads data according to the instruction from the control device 2 in step S204. When the data is written, the drive control portion 14 of the servomotor 1 drives the drive portion 15 accordingly to realize a predetermined operation.

The communication control portion 12 determines whether the return packet is necessary in step S205. For example, when a message packet according to a data reading command is received or a message packet according to a command requiring return of an ACK packet is received, the communication control portion 12 determines that the return packet is necessary.

When the communication control portion 12 determines that the return packet is necessary, the communication control portion 12 generates the return packet in step S206 and transmits the return packet to the control device 2 in step S207.

Thereafter, the communication control portion 12 returns to the processing of step S201.

Further, when the communication control portion 12 determines in step S205 that the return packet is unnecessary, the communication control portion 12 returns to the processing of step S201.

Further, the servomotor 1 performs processing sensing various types of sensing every tens of microseconds, several milliseconds, or several seconds, and storing resultant sensing data in a predetermined area of the storage portion 13, in addition to the processing illustrated in FIG. 18. This makes it possible for the control device 2 to ascertain a latest situation of the servomotor 1.

4. Modification Example

An example in which data stored in a plurality of discontinuous areas is read at once has been described in the example of the simple message packet for a reading command.

However, the present invention is not limited thereto, and even when a plurality of pieces of data stored in one continuous area are read at once or one piece of data is read, it is possible to reduce data by transmitting the simple message packet.

For example, when only the temperature data is read, 0x16 which is address information of the area in which temperature data is stored is stored in the first preset area PA1 of the storage portion 13 of the servomotor 1, and 0x01 which is a data length of the temperature data is stored in the second preset area PA2.

The simple message packet includes a header area Ar1, an ID area Ar2, and a CRC area Ar6, and an address area Ar3 and a data length area Ar4 are omitted.

0xF3 indicating the simple message packet for a reading command is stored in the header area Ar1.

This makes it possible to reduce an amount of data of the message packet even when there is only one piece of data to be read.

In each of the above-described examples, an example of a transmission target for the message packet generated by the control device 2 is the servomotor 1 attached to a device such as a control target robot, but other examples are also considered.

Specifically, a device that stores sensing data in a storage portion or a device that operates by setting a setting value in a storage portion may be used instead of the servomotor 1.

5. Conclusion

As described in each of the above examples, the communication method for communication between the control device 2 and the servomotor 1 is a communication method for a communication device (the control device 2) including the communication control portion 22a that performs communication control, the transmission portion 21s that transmits the message packet, and the reception portion 21r that receives the message packet, and includes transmitting the simple message packet in which information of at least part of the third information is omitted among first information (the information in the header area Ar1) indicating a type of processing to be executed by the target device (for example, the servomotor 1) identified as a transmission destination device for the message packet, second information (the information in the ID area Ar2) for specifying the target device, and the third information (information such as the address area Ar3, the data length area Ar4, and the data area Ar5) indicating details of the processing.

The third information differs depending on the processing type specified by the first information. For example, when the first information is information indicating reading processing, address information (information in the address area Ar3) for specifying an area which is a reading location in the storage portion, and length information (information in the data length area Ar4) indicating the length of the data to be read are included in the third information.

Further, when the first information is information indicating write processing, address information (information on the address area Ar3) of an area in the storage portion serving as the writing location, length information (information on the data length area Ar4) indicating the length of the writing data, and data to be written itself (information in the data area Ar5) are included in the third information.

In the simple message packet, for example, the address information and the length information are omitted.

Accordingly, it is possible to reduce an amount of data and to shorten time required for data transmission and reception. Further, it is possible reduce consumption of bandwidth used for communication.

Further, in the communication method for communication performed between the control device 2 and the servomotor 1, the omitted information in the third information may be stored in the storage portion 13 of the target device (for example, the servomotor 1).

This makes it possible to supplement omitted information using the target device, and realize the desired operation in the target device.

Further, in the communication method for communication performed between the control device 2 and the servomotor 1, the first information is information indicating reading processing (reading command), and part of the omitted information in the third information may be identified as address information (information in the address area Ar3) indicating the reading location in the storage portion 13, and length information (information in the data length area Ar4) indicating the length of the data to be read.

Through the omission of the address information indicating the reading location and the length information of the data to be read, the message packet includes, for example, a command header identified as the first information, a device ID identified as the second information, and CRC information identified as other information, and all of the third information may be omitted.

Therefore, it is possible to reduce an amount of data of the message packet generated as a reading command, and to shorten time required for transmission and reception of the reading command.

Further, in the communication method for communication performed between the control device 2 and the servomotor 1, the first information is information indicating write processing (writing command), and part of the omitted information in the third information may be identified as address information (information in the address area Ar3) indicating the writing location in the storage portion 13, and length information (information in the data length area Ar4) indicating the length of the writing data.

Through the omission of the address information indicating the writing location and the length information of the writing data, the third information in the message packet may include only the writing data (information in the data area Ar5), for example.

Therefore, it is possible to reduce an amount of data of the message packet generated as a writing command, and to shorten time required for transmission and reception of the writing command.

Further, in the communication method for communication performed between the control device 2 and the servomotor 1, part of the omitted information in the third information may include address information indicating a location of a specific area (the first preset area PA1) in which a plurality of pieces of information stored in a plurality of discontinuous areas in the storage portion 13 are continuously stored in the storage portion 13.

For example, when the plurality of pieces of information stored in the discontinuous areas are read, there are two types of schemes including reading the information with a plurality of reading commands, and reading the information, including in-between data stored in unnecessary areas, with one reading command.

However, in a first method, two reading commands are required.

Further, in a second method, since the in-between unnecessary data is read, an amount of data of the return packet received from the target device increases.

Further, in the case of the writing command, the first method may have to be used since the in-between data to be written in the unnecessary area is unclear.

According to this configuration, since the plurality of pieces of information stored in the discontinuous areas are continuously stored in a different specific area, it is possible to read or write only target data with one reading command or writing command.

Further, through the omission at least part of the third information in the reading command or writing command for a specific area, it becomes possible to further reduce an amount of data of the reading command or writing command.

Therefore, it is possible to reduce an amount of data of the message packet generated as a command, and to shorten time required for transmission and reception of the command.

The above-described configuration can be applied to communication devices such as the servomotor 1, for example.

This makes it possible to reduce an amount of data due to transmission and reception of the message packet performed in acquisition of a drive instruction for control of the servomotor 1 or status information.

This effect is particularly suitable for the servomotor 1 that performs two-way control, or the like.

In the two-way control, transmission of a message packet for feeding back a magnitude of force applied to the target device (the servomotor 1) to a communication device as the control device 2, or transmission of a message packets for transmitting an instruction from the control device 2 to the target device is performed at a high frequency.

It is possible to increase effects of reducing communication time due to reduction in an amount of data of the message packet by applying this configuration to such a communication device.

Therefore, it becomes possible to reduce consumption of a communication band or perform control at a higher frequency.

A program for realizing this communication method in a communication device such as the control device 2 may be recorded in an HDD (Hard Disk Drive) as a recording medium built into a device such as a computer device or a ROM in a microcomputer including a CPU in advance. Alternatively, the program may be temporarily or permanently stored (recorded) in a removable recording medium such as a flexible disk, CD-ROM (Compact Disk Read Only Memory), MO (Magneto Optical) disc, DVD (Digital Versatile Disc), Blu-ray Disc (registered trademark), magnetic disk, semiconductor memory, or memory card. This removable recording medium may be provided as so-called packaged software.

Further, such a program may be installed in a personal computer or the like from a removable recording medium, and may also be downloaded from a download site via a network such as a local area network (LAN) or the Internet.

It is also possible to obtain the various effects described above with these programs.

As described in each of the above examples, a communication method for a communication device (for example, the servomotor 1) including a communication control portion 12 that performs communication control, the transmission portion 11s that transmits the message packet, and the reception portion 11r that receives the message packet, and includes receiving a simple message packet in which information of at least part of third information is omitted among first information (the information in the header area Ar1) indicating a type of processing to be executed by the target device (the servomotor 1) identified as a transmission destination device for the message packet, second information (the information in the ID area Ar2) for specifying the target device, and the third information (information such as the address area Ar3, the data length area Ar4, and the data area Ar5) indicating details of the processing.

Further, a communication device as the servomotor 1 has a function of performing communication control, a function of receiving a simple message packet in which information of at least part of third information is omitted among first information (the information in the header area Ar1) indicating a type of processing to be executed by the target device (the servomotor 1) identified as a transmission destination device for the message packet, second information (the information in the ID area Ar2) for specifying the target device, and third information (information such as the address area Ar3, the data length area Ar4, and the data area Ar5) indicating details of the processing, and a function of acquiring the information of the part from the storage portion 13, and performing writing or reading based on the first information, the second information, and the third information on the storage portion 13.

Further, the communication system S including the servomotor 1 and the control device 2 is a communication system S including a plurality of communication devices, and at least portion (for example, the control device 2) of each communication device includes a communication control portion 21a that performs communication control, a transmission portion 21s that transmits a message packet, and a reception portion 21r that receives the message packet, and the communication control portion 21a transmits a simple message packet in which information of at least part of third information is omitted among first information (the information in the header area Ar1) indicating a type of processing to be executed by the target device (for example, the servomotor 1) identified as a transmission destination device for the message packet, second information (the information in the ID area Ar2) for specifying the target device, and the third information (information such as the address area Ar3, the data length area Ar4, and the data area Ar5) indicating details of the processing.

It is also possible to obtain the various effects described above using such a communication device or communication system.

Further, it is possible to combine the above-described examples in any way, and it is possible to obtain the various effects described above even when various combinations are used.

The invention claimed is:

1. A communication method for a communication device including:
    a communication control portion configured to perform communication control;
    a transmission portion configured to transmit a message packet; and
    a reception portion configured to receive the message packet, the communication method comprising:
    transmitting a simple message packet in which information of at least part of third information is omitted among first information indicating a type of processing to be executed by a target device identified as a transmission destination device for the message packet, second information for specifying the target device, and the third information indicating details of the processing.

2. The communication method of claim 1, wherein the omitted information in the third information is stored in a storage portion of the target device.

3. The communication method of claim 2, wherein the first information is identified as information indicating reading processing, and
    the information of the part of the third information is identified as address information indicating a reading location in the storage portion and length information indicating a length of data to be read.

4. The communication method of claim 2, wherein the first information is identified as information indicating writing processing, and
    the information of the part of the third information is identified as address information indicating a writing location in the storage portion and length information indicating a length of data to be written.

5. The communication method of claim 2, wherein the information of the part of the third information includes address information indicating a location of a specific area at which a plurality of pieces of information stored in a plurality of discontinuous areas in the storage portion are continuously stored in the storage portion.

6. The communication method of claim 1, wherein the target device is identified as a servomotor unit including a communication control portion.

7. The communication method of claim 1, wherein the target device is identified as a control target device for two-way control.

8. A communication method for a communication device including:
    a communication control portion configured to perform communication control;
    a transmission portion configured to transmit a message packet; and
    a reception portion configured to receive the message packet, the communication method comprising:
    receiving a simple message packet in which information of at least part of third information is omitted among first information indicating a type of processing to be executed by a target device identified as a transmission destination device for the message packet, second information for specifying the target device, and the third information indicating details of the processing.

9. A communication device comprising:

a communication control portion configured to perform communication control;

a reception portion configured to receive a simple message packet in which information of at least part of third information is omitted among first information indicating a type of processing to be executed by a target device identified as a transmission destination device for the message packet, second information for specifying the target device, and the third information indicating details of the processing; and a control portion configured to acquire the information of the part from a storage portion, and perform writing or reading based on the first information, the second information, and the third information on the storage portion.

10. A communication system including a plurality of communication devices, each communication device comprising:

a communication control portion configured to perform communication control;

a transmission portion configured to transmit a message packet; and a reception portion configured to receive the message packet, wherein the communication control portion transmits a simple message packet in which information of at least part of third information is omitted among first information indicating a type of processing to be executed by a target device identified as a transmission destination device for the message packet, second information for specifying the target device, and the third information indicating details of the processing.

* * * * *